Sept. 11, 1923.  C. G. KELLER  1,467,856
AUTOMOBILE BED
Filed Oct. 24, 1922   2 Sheets-Sheet 1
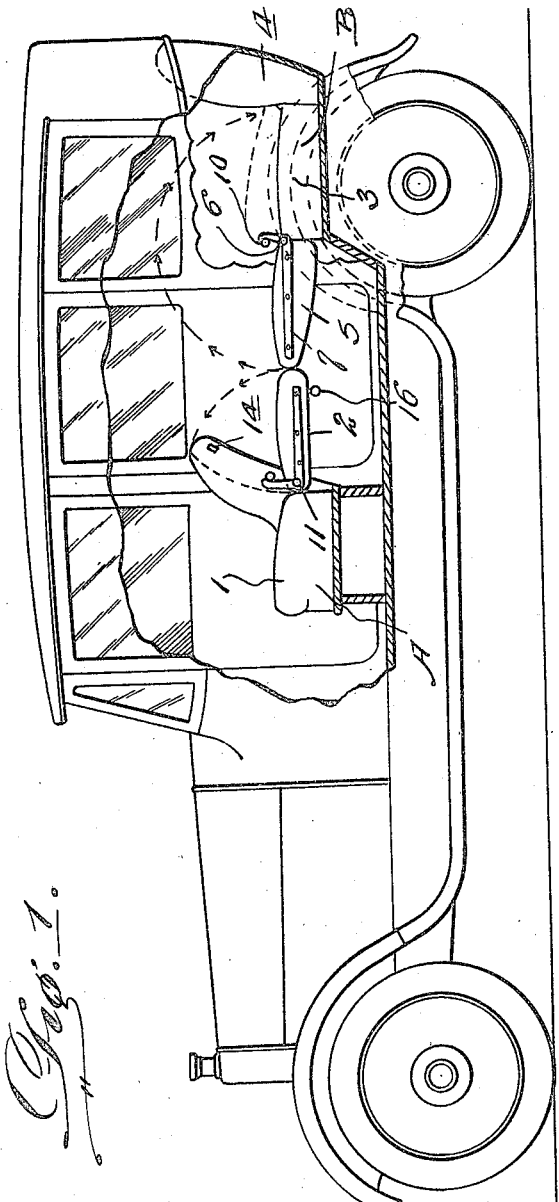
C. G. Keller,
INVENTOR.

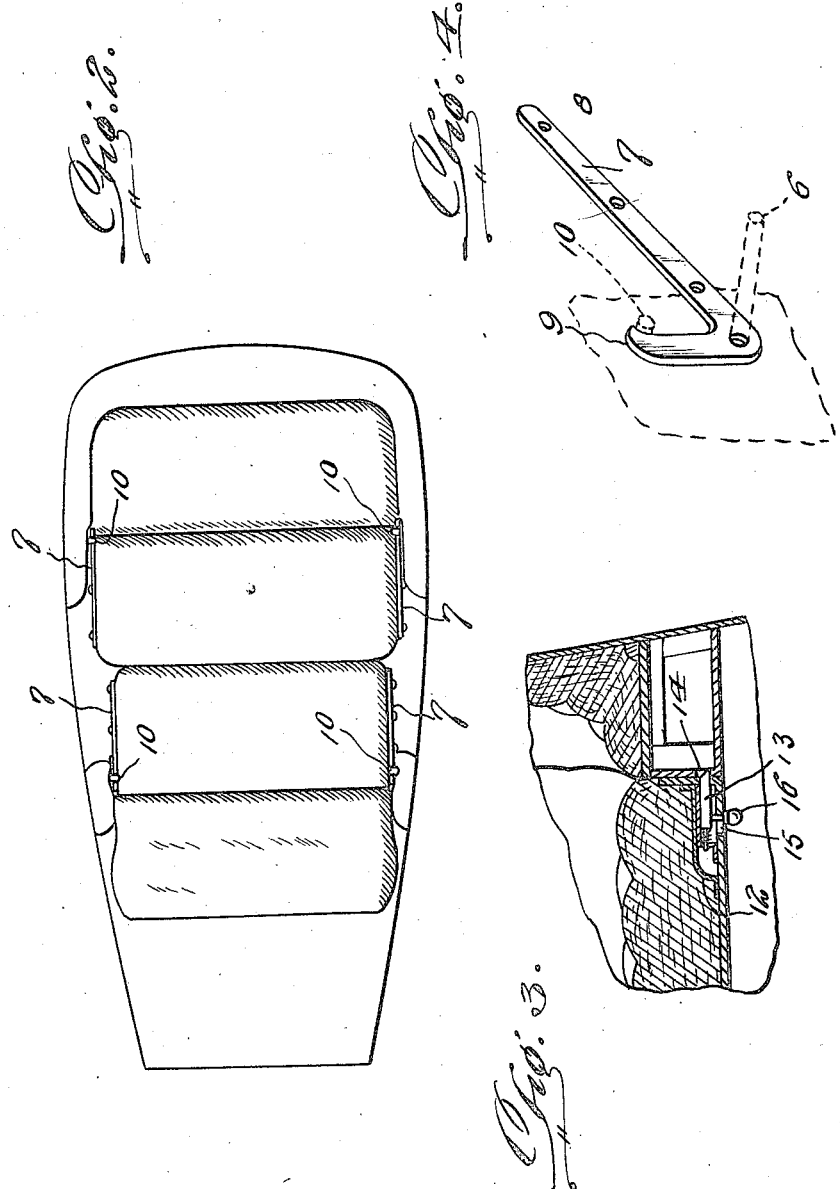

Patented Sept. 11, 1923.

1,467,856

UNITED STATES PATENT OFFICE.

CARL G. KELLER, OF DETROIT, MICHIGAN.

AUTOMOBILE BED.

Application filed October 24, 1922. Serial No. 596,663.

*To all whom it may concern:*

Be it known that I, CARL G. KELLER, a citizen of the United States, residing at Detroit, in the county of Wayne and State of Michigan, have invented certain new and useful Improvements in Automobile Beds, of which the following is a specification.

The primary object of this invention resides in the provision of seat members for motor vehicles, wherein the same may be so positioned with respect to each other as to provide a bed within the body of the vehicle for a great number of known purposes.

A further object of the invention resides in the provision of the front and rear seat members of a motor vehicle for accomplishing the above purposes that are simple of construction, inexpensive of manufacture and highly useful of purpose.

The nature and advantages of the invention will be better understood when the following detailed description is read in connection with the accompanying drawings, the invention residing in the construction, combination, and arrangement of parts as claimed.

In the drawings forming a part of this application, like numerals of reference indicate similar parts in the several views, and wherein:—

Figure 1 is a side elevational view of a motor vehicle, a portion of the body being broken away for disclosing more clearly the arrangement of the seats therein, which are constructed in accordance with the present invention.

Figure 2 is a top plan view of the vehicle seat arrangement, the same being shown in such a position as to provide a bed within the vehicle.

Figure 3 is a vertical cross sectional view through one side of the back of the front seat disclosing a means for retaining the back of this seat in a raised position, and Figure 4 is a perspective view of one of the side arms carried by the ends of the swinging sections for retaining these sections in position for forming the bed.

With particular reference to the drawings, there is shown a motor vehicle having a front and rear seat arrangement designated in general by the letters A and B. The front seat A comprises the usual spring cushion 1, and back 2, and the rear seat B, the cushion 3, and back 4.

Supported upon the cushion 3 of the rear seat, there is an auxiliary cushion 5, which cushion is hingedly mounted to the side portions of the vehicle body by a pivot rod 6 secured between the sides of the body and at the front side of the rear cushion 3 and at the upper end thereof. Each end wall of the auxiliary cushion 5 has a longitudinally extending bar 7 secured thereto by means of screws or the like engaging through perforations 8 in these bars, and the inner ends of each of these bars are hooked upwardly as at 9 for engaging inwardly directed pins 10 carried by the side walls of the vehicle body and projecting through the side cushion portion thereof.

The back 2 of the front seat A is pivotally secured between the end cushions thereof as at 11, and each end of the back 2 of the front seat A is provided with similar longitudinally extending bars 7 secured thereto and having the inner ends thereof similarly hooked upwardly as at 9 for engaging the inwardly directed pins 10 upon the inner walls of the front seat side cushions. It will therefore be seen that when the back 2 of the front seat A and the auxiliary seat 5 of the rear seat B are swung upon their pivots as shown in Figure 1, these members will be retained in an alined position in view of the arms 7 having the hooked ends thereof engaging the above mentioned pins 10. It will be further seen that when these members 2 and 5 are positioned in this manner, these members will cooperate with the cushion 1 of the front seat A and the cushion 3 of the rear seat B for providing a bed within the body of the vehicle.

As a means for retaining the back 2 of the front seat A in an upright position, the upper opposite ends of this back 2 has a bolt casing 12 secured thereto and within this bolt casing is a spring projected sliding bolt 13 adapted to project through the side walls of the seat 2 and engage within an opening 14 in the upper ends of the side cushions as more clearly shown in Figures 1 and 3.

The rear wall of the seat 2 is slotted as at 15 for allowing an operating knob 16 to extend therethrough, which operating knob is formed upon the bolt 13 and is adapted for retracting these bolts within their casing to allow the back 2 to extend downwardly as shown in Figure 1.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as new is:—

A vehicle provided with spaced alined front and rear seats, a rearwardly swinging hinged back for the front seat, means to support said back in horizontal alinement with the front and rear seats when swung rearwardly, a double cushion for the rear seat, the two parts of said double cushion being connected at adjacent edges to permit one part to be swung forwardly to a horizontal position between the back of the front seat and the other part of said cushion, and means to support said one part of the cushion in its forwardly swung horizontal position, said back and cushion supporting means comprising bars fixed to the sides thereof and having rigid laterally projecting hooks upon the inner ends thereof adjacent the pivots of the back and the cushion, and stop pins fixed above said pivots adapted to be engaged by said hooks when the back and cushion are alined.

In testimony whereof I affix my signature.

CARL G. KELLER.